Dec. 23, 1941.   J. L. DRAKE   2,267,605
APPARATUS FOR HANDLING SHEET GLASS
Filed Jan. 9, 1939   6 Sheets-Sheet 1

Inventor
JOHN L. DRAKE.
By Frank Fraser
Attorney

Dec. 23, 1941.  J. L. DRAKE  2,267,605
APPARATUS FOR HANDLING SHEET GLASS
Filed Jan. 9, 1939  6 Sheets-Sheet 2

Inventor
JOHN L. DRAKE.
By
Frank Fraser
Attorney

Dec. 23, 1941.     J. L. DRAKE     2,267,605

APPARATUS FOR HANDLING SHEET GLASS

Filed Jan. 9, 1939     6 Sheets-Sheet 3

Inventor
JOHN L. DRAKE.

By Frank Fraser
Attorney

Dec. 23, 1941.  J. L. DRAKE  2,267,605
APPARATUS FOR HANDLING SHEET GLASS
Filed Jan. 9, 1939  6 Sheets-Sheet 4

Inventor
JOHN L. DRAKE.
By Frank Fraser
Attorney

Dec. 23, 1941.  J. L. DRAKE  2,267,605
APPARATUS FOR HANDLING SHEET GLASS
Filed Jan. 9, 1939  6 Sheets-Sheet 6

Inventor
JOHN L. DRAKE.
By Frank Fraser
Attorney

Patented Dec. 23, 1941

2,267,605

UNITED STATES PATENT OFFICE 2,267,605

APPARATUS FOR HANDLING SHEET GLASS

John L. Drake, Toledo, Ohio, assignor to Libbey-Owens-Ford Glass Company, Toledo, Ohio, a corporation of Ohio Application January 9, 1939, Serial No. 249,962

6 Claims. (Cl. 193—35)

The present invention relates broadly to cutting apparatus and more particularly to improvements in apparatus for cutting and handling sheet glass.

An important object of the invention is the provision of novel apparatus for cutting off and handling individual sheets or sections of a continuously formed sheet or ribbon of glass as it leaves the outlet end of the annealing leer.

Another important object of the invention is the provision of novel apparatus embodying means for receiving the cut sheets or sections and splitting them transversely to form a plurality of strips of predetermined widths, after which the glass is shifted at substantially right angles to the line of cut to make room for the oncoming sheet or section.

A further important object of the invention is the provision of novel apparatus for effecting the cutting and handling of sheet glass in the above manner rapidly, accurately, and efficiently and with a minimum amount of breakage and waste.

Other objects and advantages of the invention will become more apparent during the course of the following description, when taken in connection with the accompanying drawings.

In the drawings, wherein like numerals are employed to designate like parts throughout the same:

Fig. 2 is a plan view of the apparatus for splitting the individual sheet sections to form a plurality of strips;

Figure 1:
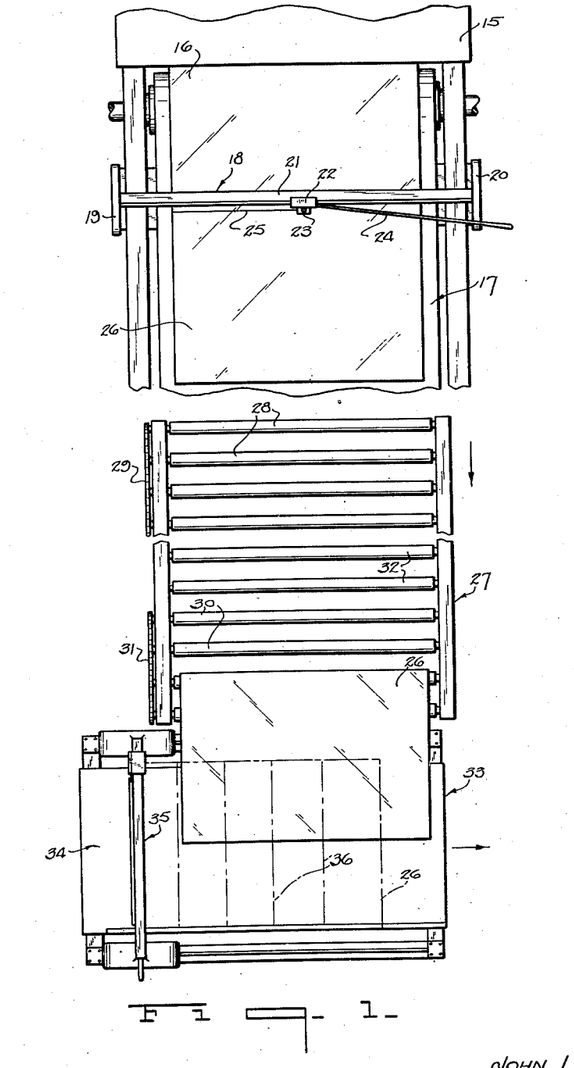
Fig. 1 is a plan view of apparatus for cutting and handling sheet glass constructed in accordance with the present invention.

Referring now to the drawings and particularly to Fig. 1, the numeral 15 designates the outlet end of a horizontal annealing leer of any conventional or preferred construction and 16 a continuous sheet or ribbon of glass emerging therefrom. Positioned closely adjacent the outlet end of the leer, to receive the glass ribbon therefrom and carry it forwardly, is an endless cutting or capping table 17 which travels in the same direction and preferably at the same speed as the continuous ribbon.

As the continuous ribbon 16 emerges from leer 15 upon capping table 17, it is adapted to be cut transversely into individual sheets or sections of the desired length and for this purpose there is provided the cross cutting mechanism designated in its entirety by the numeral 18. This cutting mechanism may be of any conventional or approved construction as the specific structural details thereof form no part of the present invention. For instance, it may be of the general type disclosed in the patent to John L. Drake, No. 1,724,261, issued August 13, 1929, and is adapted for movement with the sheet during the transverse scoring thereof.

The cutting mechanism 18 herein disclosed embodies generally a pair of carriages 19 and 20 arranged at opposite sides of the endless capping table 17 and movable longitudinally thereof upon suitable tracks (not shown). Extending transversely across the table and connecting the carriages 19 and 20 is a cutter guide member 21 upon which is slidably mounted a cutter carriage 22 carrying the cutter 23. The cutter carriage and cutter are movable manually along the cutter guide by an operating rod 24. Upon drawing of said cutter across and in contact with the continuous ribbon 16, it is adapted to effect the scoring thereof as indicated at 25. The glass is then broken along the score line 25 in a well known manner to provide individual sheets or sections 26. Any suitable means may be employed for causing the cutting mechanism 18 to move with the glass during the scoring of the latter and to return to starting position after the scoring has been completed. The cutting mechanism 18 is adapted to effect an accurate cutting of the glass ribbon so that the front and rear edges of the individual sheets 26 will be parallel with one another.

When the individual glass sheets 26 leave the capping table, they are delivered to a roller conveyor or runway 27 comprising a series of horizontally aligned rolls 28, continuously driven by a chain and sprocket drive or the like 29, and a series of horizontally aligned rolls 30 intermittently driven by a sprocket and chain drive or the like 31. Interposed between the continuously driven rolls 28 and intermittently driven rolls 30 are a plurality of idler rolls 32.

The glass sheets 26 are delivered from the rolls 30 to the splitting apparatus designated in its entirety by the numeral 33; said apparatus including a supporting table 34 for receiving the glass sheets thereon and the cutting mechanism 35 adapted to score the glass sheets transversely as indicated at 36 to separate them into a plurality of strips of predetermined widths. The glass sheets can be split into strips of 8", 10", 12", etc., or simply cut in half as preferred. The glass sheets are then broken along the score lines 36, removed from the table 34, and subsequently cut transversely into panes or lights of the desired sizes. By properly squaring-up the glass sheets on the table 34, the score lines 36 will not only be parallel with one another but also at right angles to the front and rear edges of the sheets.

The splitting apparatus 33 is illustrated in detail in Figs. 3 to 9 inclusive and reference will now be had thereto. The glass supporting table 34 comprises a substantially rectangular framework including the longitudinally extending supporting beams 37 and 38 arranged along the front and rear of the table and upon which are mounted the transverse supporting beams 39 and 40 arranged at the opposite ends of said tables. The top of the table 34 comprises a horizontal substantially rectangular stationary frame 41 including the spaced parallel, longitudinally extending side members 42 and 43 and the transverse end members 44 and 45. The frame 41 is carried at its opposite ends upon spaced supporting blocks 46 and 47 mounted upon the transverse supporting beams 39 and 40; being rigidly secured thereto by bolts or the like 48 and 49 passing through the end members 44 and 45 of said frame.

Figure 5:
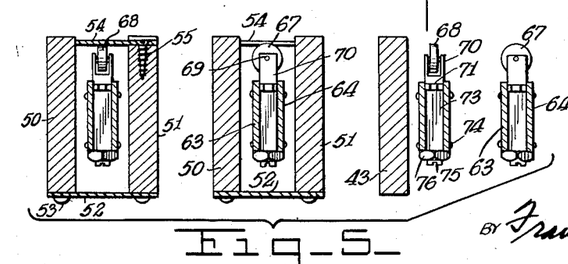
Fig. 5 is a detail transverse section through the glass supporting table taken substantially on line 5—5 of Fig. 2.

The top of the table 34 also includes a plurality of pairs of longitudinally extending strips 50 and 51 arranged between and parallel with the side members 42 and 43 of the frame 41 and suitably secured to the end members 44 and 45 thereof. The strips 50 and 51 of each pair are preferably connected together at their lower ends by a plurality of metal plates 52 secured in place by screws or the like 53. The strips 50 and 51 are maintained properly spaced from one another at their upper ends by metal plates 54, said plates being secured at one end to one of the strips by screws or the like 55 and having the opposite end thereof engaging the inner face of the other strip (Fig. 5).

Extending transversely of the table 34 at the opposite ends thereof are shafts 56 and 57, each being journaled at one end in a bearing 58 and at its opposite end in a bearing 59. The shafts are also journaled intermediate their ends in bearings 60 mounted upon the supporting blocks 46 and 47 which are carried by the transverse supporting beams 39 and 40 respectively. Keyed to each of the shafts 56 and 57 are the two series of cams 61 and 62 which extend radially in different directions with respect to said shaft.

Extending longitudinally of the table 34 are a plurality of pairs of plates 63 and 64 provided at their opposite ends with rollers 65 and 66 which are freely supported upon the cams 61 and 62 fixed to the shafts 56 and 57. Carried by every other pair of plates 63 and 64 are a series of rolls 67, while carried by the alternate pairs of plates are a series of rolls 68. Each of the rolls 67 and 68 is freely rotatable upon a horizontal pin 69 mounted in a bracket 70. The bracket 70 is carried at the upper end of a vertical post 71 received within an opening 72 in a block 73 which is arranged between the corresponding pair of plates 63 and 64 and secured thereto by screws or the like 74. The blocks 73 not only serve to maintain the plates 63 and 64 in properly spaced relation but also serve to connect said plates together to form a single unit. The post 71 is adapted to fit snugly within block 73 so that it will not rotate therein although it can be moved upwardly and downwardly within opening 72 to raise or lower the roll carried thereby. To effect this adjustment, there is threaded within the lower end of opening 72 a screw 75 having threaded upon its lower end a lock nut 76.

The rolls 67 and 68 are arranged at substantially right angles relative to one another and are adapted to support and carry the glass sheets transversely and longitudinally of the table respectively. To this end, the pins 69 carrying rolls 67 extend longitudinally of the table, while the pins carrying rolls 68 extend transversely of the table. In this way, the rolls 67 and 68 rotate about axes extending at right angles relative to one another.

The pairs of plates 63 and 64 carrying the rolls 67 are freely supported at their opposite ends upon the cams 61 while the pairs of plates 63 and 64 carrying the rolls 68 are freely supported upon the cams 62. Upon rotation of the shafts 56 and 57 the cams 61 and 62 are adapted to move the opposite ends of the plates 63 and 64 upwardly and downwardly to raise or lower the rolls 67 and 68. As will be more clearly hereinafter described the rolls 67 are adapted to receive the glass sheets 26 from the roller runway 27 and deposit them upon the stationary top of the table preliminary to scoring, while the rolls 68 are adapted to lift the glass from the stationary top of the table subsequent to the cutting thereof and to deliver it longitudinally therefrom. For the purpose of guiding the plates 63 and 64 in their vertical movements, while at the same time preventing horizontal movement thereof, there are carried by the transverse supporting beams 39 and 40, a plurality of L-shaped brackets 77 and 78 to which are secured the vertical guide members 79 and 80 respectively. One pair of guide members 79 and 80 is provided for each pair of plates 63 and 64 and pass upwardly therebetween. Arranged between each pair of plates, adjacent the opposite ends thereof, are the pairs of horizontally spaced guide rollers 81—81 and 82—82 between which the guide members 79 and 80 are received, said rollers engaging the opposite edges of said guide members.

The shafts 56 and 57 are adapted to be driven in unison to raise and lower the opposite ends of the plates 63 and 64 simultaneously. To this end, there is arranged longitudinally of the table 34 a shaft 83 journaled at its opposite ends in the bearings 59 provided at the opposite ends of the table. Keyed to one end of the shaft 83 is a worm 84 (Fig. 3) meshing with a worm gear 85 fixed to the adjacent end of shaft 56; while keyed to the opposite end of shaft 83 is a worm 86 (Fig. 4) meshing with a worm gear 87 fixed on the adjacent end of shaft 57. The shaft 83 is provided at each end, beyond the respective bearing 59, with a hexagonal head 88 for the reception of a crank 89, by means of which the said shaft may be operated from either end of the table to rotate shafts 56 and 57 to raise and lower the plates 63 and 64 and glass supporting rolls 67 and 68 carried thereby.

The cutting mechanism 35 may be and preferably is of substantially the same construction as disclosed in the patent to J. L. Drake No. 2,033,188, issued March 10, 1936. Therefore, only enough of the cutting mechanism has been illustrated in the drawings and will be described herein for a complete understanding of the present invention and for a more detailed disclosure of the specific details of construction attention is invited to the Drake Patent 2,033,188.

Extending longitudinally at opposite sides of the table 34 are beams 90 and 91 secured at their opposite ends to the transverse supporting beams 39 and 40 by bolts or the like 92. Mounted upon the upper surfaces of the beams 90 and 91 are rails 93 and 94 provided with the centrally disposed, longitudinally extending ribs 95 and 96 respectively. Mounted upon the rails 93 and 94 are the carriages 97 and 98 respectively, supported by wheels or rollers 99 and 100 which run along upon the ribs 95 and 96 respectively. Extending between and carried by the carriages 97 and 98 is a transverse cutter guide 101 upon which the cutter unit, designated in its entirety by the numeral 102, is slidably mounted. The cutter guide 101 is pivotally mounted at one end upon the carriage 98 as indicated at 103, while the opposite end thereof is supported upon the carriage 97 as indicated at 104. The cutter guide is provided with a handle 105 by means of which the operator can move the cutting mechanism along the rails 93 and 94 to the desired position. The cutter unit 102 is adapted to be moved along the cutter guide 101 by means of a rod 106 and includes a cutting tool 107 for scoring the glass as the said unit is slid along the cutter guide. The cutter carriages 97 and 98 may be connected together beneath the table by a plurality of tubular members 108 so that the said carriages will move in unison.

In the operation of the apparatus above described, the glass ribbon 16, issuing from the annealing leer 15, is first cut transversely into a plurality of individual sheets or sections 26 by means of the cutting mechanism 18. The sheets 26 are then delivered to and passed over the roller runway 27 to the splitting apparatus 33. When the glass sheet is passed from the rolls 30 of runway 27 onto the supporting table 34 of the splitting apparatus, it is initially received and supported upon the rolls 67. At this time, the rolls 67 and 68 will be disposed in the relative positions indicated in Fig. 8. In other words, the shafts 56 and 57 are rotated in the direction indicated by the arrow in Fig. 7 so that the cams 61 will raise the rolls 67 while, at the same time, the rolls 68 will be lowered.

Figure 7:
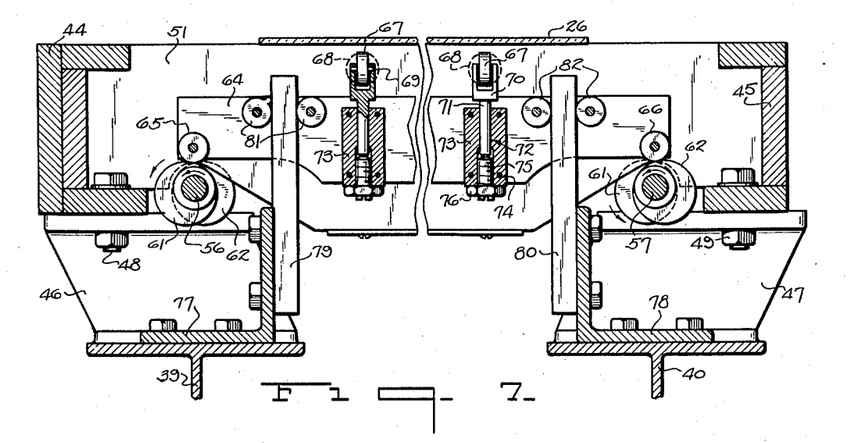
Fig. 7 is a vertical longitudinal section through the glass supporting table taken substantially on line 7—7 of Fig. 2.
Figure 8:
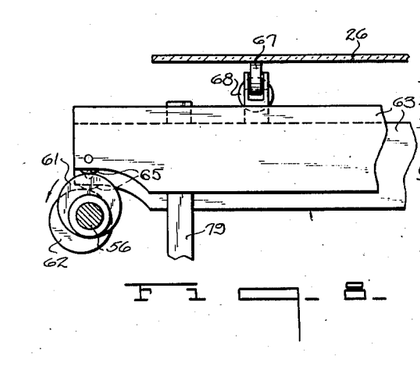
Figs. 8 and 9 are views illustrating the operation of the raising and lowering mechanism for the glass carrying rollers of the supporting table.

When the rolls 67 are in raised position they will project slightly above the stationary strips 50 and 51 of the frame 41 constituting the stationary top of the table. After the glass sheet has been moved from the roller runway 27 onto the rolls 67, the shafts 56 and 57 are rotated to lower the rolls 67 to bring the glass sheet to rest upon the stationary strips 50 and 51 as shown in Fig. 7. At this time, the cams 61 and 62 will assume the positions illustrated in Fig. 7 so that the two rolls 67 and 68 will be disposed in substantial horizontal alignment and beneath the upper edges of the strips 50 and 51.

Figure 9:
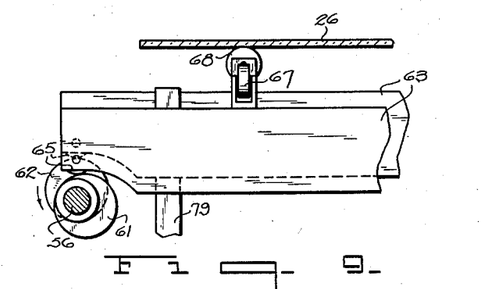

The glass sheet 26 is then properly squared-up on the table and the cutting mechanism 35 operated to split the sheet into as many strips as may be desired by scoring it as at 36 in Fig. 1. After the scoring has been accomplished, the sheet is adapted to be cracked along the score lines by vertical movement of the breaker rolls 116. The shafts 56 and 57 are then again rotated to cause the cams 62 to raise the rolls 68 as shown in Fig. 9. When this is done, the glass will be lifted up off of the stationary strips 50 and 51 and supported upon the said rolls so that it can be shifted at right angles to the line of cut and removed from the end of the table. After the glass has been removed from the table, the shafts 56 and 57 are again rotated to lower the rolls 68 and raise rolls 67 into the position shown in Fig. 8 to receive another sheet to be cut from the roller runway 27.

To facilitate the proper positioning of the cutting mechanism, there is arranged along the back of the table 34 a longitudinally extending scale plate 109 having suitable graduations 110 marked thereon; said scale plate being carried at its opposite ends by brackets 111 and 112 secured to the supporting framework. The cutter guide 101 carries a vertical pointer 113 adapted to cooperate with the graduations on the scale plate to indicate to the operator the position of the cutting tool.

Extending transversely beneath the table and preferably positioned directly beneath the cutter guide 101 is a cross shaft 114 (Fig. 3) supported at its opposite ends by the carriages 97 and 98. Mounted upon the shaft 114, at a plurality of spaced points throughout its length, are the substantially vertical lever arms 115, each carrying at its upper end a freely rotatable breaker roll 116. The shaft 114 projects beyond the carriage 97 and is provided at its outer end with an operating handle 117 which is adapted to be actuated by the operator when it is desired to break the glass sheet along the score line. After the score has been made across the glass sheet, the operator will depress the handle 117 thereby rocking shaft 114 in a clockwise direction and simultaneously lifting all of the rolls 116 against the lower surface of the sheet and elevating the same adjacent the score line until it breaks along this line. A stop bolt 118, carried by carriage 97, is engageable by the handle 117 to limit the upward movement thereof and in consequence the downward movement of the breaker rolls 116.

In order to facilitate the accurate squaring-up of the glass sheet 26 upon cutting table 34, there is provided a straight edge 119 secured upon the upper edge of the longitudinally extending front member 42 and provided with suitable graduations 120 if desired. The forward edge of the glass sheet can be lined or squared-up by the operator with the straight edge before the scoring thereof.

Figure 3:
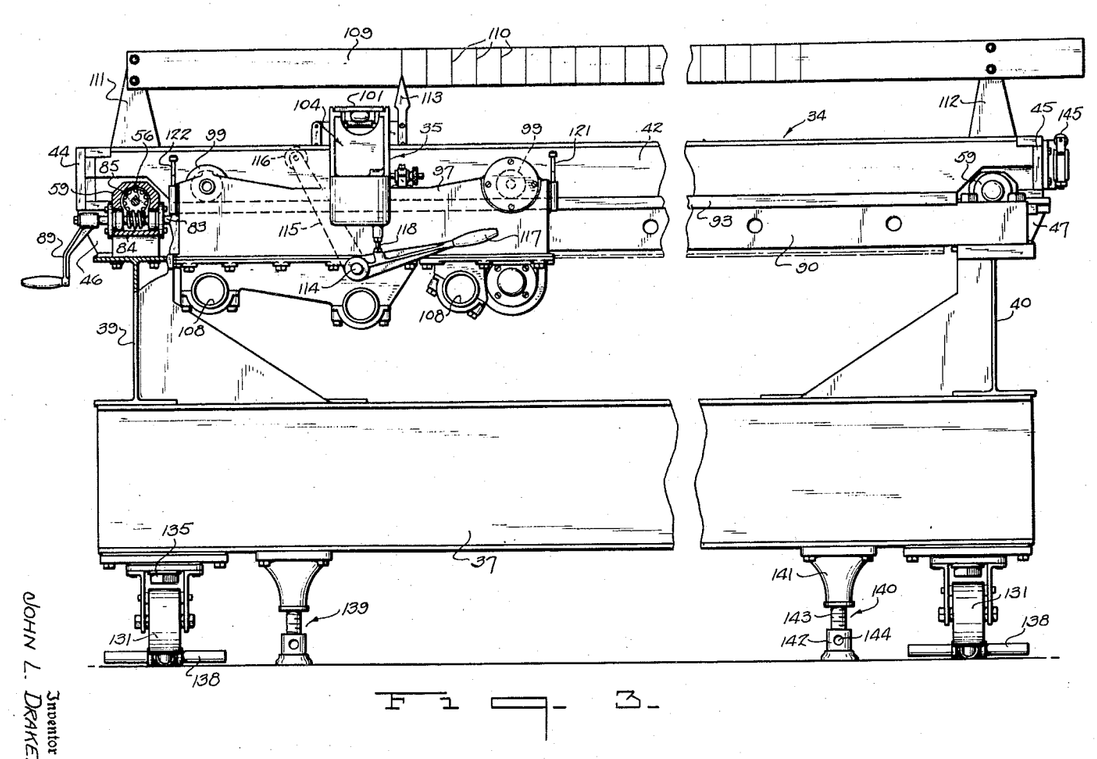
Fig. 3 is a front elevation of the apparatus of Fig. 2, partially in section.
Figure 4:
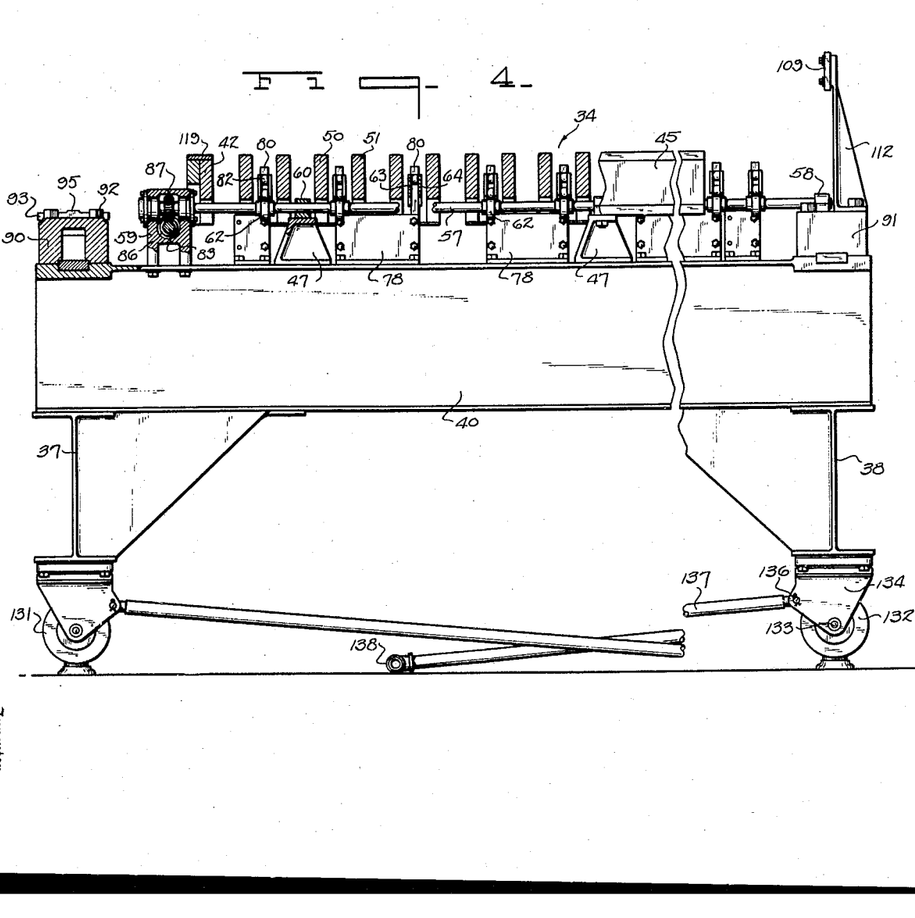
Fig. 4 is a transverse section of the glass supporting table taken substantially on line 4—4 of Fig. 2.
Figure 6:
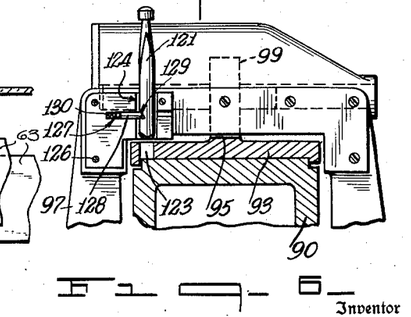
Fig. 6 is a detail section of the splitting mechanism taken substantially on line 6—6 of Fig. 2.

It is also preferred that means be provided for locking the cutting mechanism 35 in position during the scoring of the sheet to assure an accurate cut. To this end, there are provided at opposite ends of the carriage 97 the locating pins 121 and 122, which are adapted to be received at their lower ends within openings 123 in the rail 93. As best shown in Figs. 2, 3, and 6, each pin 121 and 122 is received within a vertical opening 124 formed in the adjacent end wall of the carriage 97 and the cooperating plate 125 secured to the carriage by suitable fastening elements 126. The end wall of the carriage is also provided with a horizontal recess 127 in which is arranged a catch 128 adapted to engage in a notch 129 in the respective locating pin 121 or 122. Disposed within the recess 127 in back of catch 128 is a spring 130. The spring 130 normally urges the catch 128 outwardly to engage within the notch 129 of the pin and maintain the same in elevated position (Fig. 6). However, when it is desired to lock the cutting mechanism against movement, it is simply necessary for the operator to press downwardly on the desired pin whereupon the catch 128 will be forced inwardly against the action of spring 130 and the lower end of the pin received within opening 123.

The cutting table 34 is preferably mounted upon wheels or casters so that it can be moved to any desired position although it is preferred that the table be maintained in a fixed position during the cutting operation. To this end, there is provided at each end of the table a pair of wheels or casters 131 and 132, each being carried upon an axle 133 mounted in a bracket 134. The brackets 134 are swiveled to the longitudinally extending supporting beams 37 and 38 by bolts or the like 135 (Fig. 3) so that the table can be moved in any direction. To facilitate movement of the table, there is pivoted to each of the brackets 134 as at 136 a lever 137 provided at its outer end with a transverse handle 138. By grasping the handle 138, the table can be moved about as desired.

After the table has been properly located, it is adapted to be maintained in fixed position by a pair of jacks 139 and 140 carried at each side of the table (Fig. 3). Each jack comprises a fixed section 141 secured to the longitudinally extending beam 37 or 38 and a movable section 142; said movable section carrying a vertical screw 143 which is threaded upwardly into the fixed section 141. The movable section 142 is provided with an opening 144 within which a suitable tool may be inserted for rotating the same. Upon rotation of the sections 142, the cutting table can be moved upwardly off of the rollers 131 and 132 and the weight thereof carried by the jacks.

Arranged at the end of the table 34 at which the glass is removed are a series of take-off rollers 145 carried between spaced strips 151 and 152 which are secured by brackets 153 to the end member 45 of the table.

Figure 10:
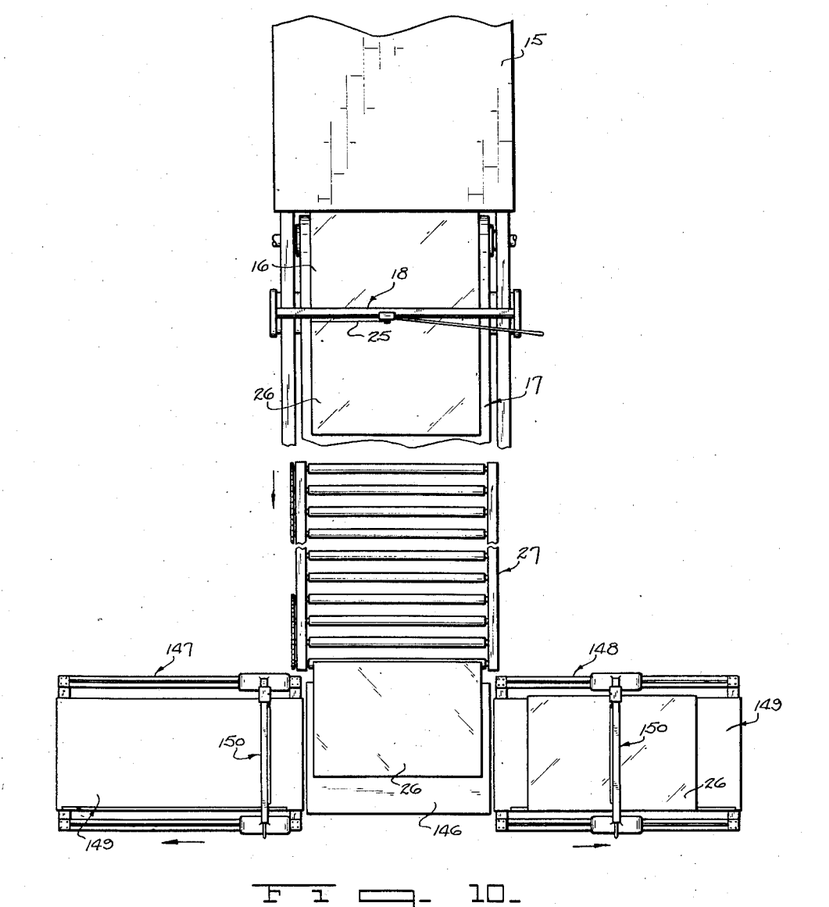
Fig. 10 is a view similar to Fig. 1 but showing an alternative arrangement.

In Fig. 10 of the drawings is illustrated a modified type of installation which may be used in some instances. As here shown, instead of providing a single splitting apparatus for stripping the glass sheets, there is arranged at the outer end of the roller conveyor 27 a table 146 for receiving the glass sheets 26 thereon and positioned at opposite sides of the table are the two splitting mechanisms 147 and 148, each comprising the table 149 and the cutting means 150. Successive sheets of glass 26 are delivered alternately from the table 146 to the splitting mechanisms 147 and 148 and, after being cut, are moved off of the tables in the directions indicated by the arrows.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the cutting of sheet glass, a cutting table including a stationary sheet supporting portion, a vertically movable sheet supporting portion including two sets of freely rotatable rollers movable vertically relative to one another and to a position either above or beneath said stationary portion, said sets of rollers rotating about horizontal axes arranged at substantially right angles to one another, cam means for supporting the two sets of rollers, and means for actuating said cam means to raise first one set of rollers above the stationary sheet supporting portion of the table and then the other set of rollers.

2. In apparatus for use in the cutting of sheet glass, a cutting table including a stationary sheet supporting portion, a vertically movable sheet supporting portion including two sets of freely rotatable rollers movable vertically relative to one another and to a position either above or beneath said stationary portion, said sets of rollers rotating about horizontal axes arranged at substantially right angles to one another, rotatable cam members for supporting the two sets of rollers, and means for rotating said cam members to raise first one set of rollers above the stationary sheet supporting portion of the table and then the other set of rollers.

3. In apparatus for use in the cutting of sheet glass, a cutting table including a stationary sheet supporting portion, a vertically movable sheet supporting portion including two sets of freely rotatable rollers movable vertically relative to one another and to a position either above or beneath said stationary portion, said sets of rollers rotating about horizontal axes arranged at substantially right angles to one another, two series of rotatable cams arranged adjacent each end of the table for supporting the two sets of rollers, shafts upon which said cams are mounted, and means for rotating said shafts to cause the two series of cams to successively raise first one set of rollers above the stationary sheet supporting portion of the table and then the other set of rollers.

4. In apparatus for use in the cutting of sheet glass, a cutting table comprising a stationary sheet supporting portion, a vertically movable sheet supporting portion including two sets of freely rotatable rollers movable vertically relative to one another and to a position either above or beneath said stationary portion, said sets of rollers rotating about horizontal axes arranged at substantially right angles to one another, means for carrying the two sets of rollers, cam means for supporting said roller carrying means, means for actuating said cam means to raise first one set of rollers above the stationary sheet supporting portion of the table and then the other set of rollers, and means associated with the said roller carrying means for guiding the two sets of rollers in their vertical movements and for also preventing horizontal movement thereof.

5. In apparatus for use in the cutting of sheet glass, a cutting table including a stationary sheet supporting portion, a vertically movable sheet supporting portion including two sets of rotatable rollers movable vertically relative to one another and to a position either above or beneath said stationary portion, said sets of rollers rotating about horizontal axes arranged at substantially right angles to one another, means for supporting the two sets of rollers, and means for actuating said roller supporting means to raise first one set of rollers above the stationary sheet supporting portion of the table and then the other set of rollers.

6. In apparatus for use in the cutting of sheet glass, a cutting table including a stationary sheet supporting portion, a vertically movable sheet supporting portion including two sets of rotatable rollers movable vertically relative to one another and to a position either above or beneath said stationary portion, said sets of rollers rotating about horizontal axes arranged at substantially right angles to one another, rotatable means for supporting the two sets of rollers, and means for actuating said rotatable roller supporting means to raise first one set of rollers above the stationary sheet supporting portion of the table and then the other set of rollers.

JOHN L. DRAKE.